UNITED STATES PATENT OFFICE.

MICHAEL STRAUB, OF SAN FRANCISCO, CALIFORNIA.

PILE REMEDY.

979,395.  Specification of Letters Patent.  Patented Dec. 20, 1910.

No Drawing.  Application filed April 8, 1910. Serial No. 554,147.

*To all whom it may concern:*

Be it known that I, MICHAEL STRAUB, citizen of the United States, residing at San Francisco, in the county of San Francisco and State of California, have invented new and useful Improvements in Pile Remedies, of which the following is a specification in such full and clear terms as will enable those skilled in the art to make and use the same.

This invention relates to a remedy for piles, and its object is to make use of a new tincture in salves for that purpose.

The body of the medicine comprises a tincture made up by maceration and percolation of leaves of a plant known in the German as "*Garben Kraut*" and in the English as "caraway." The maceration of the leaves is accomplished with a 50 per cent. solution of water and alcohol. One pound of the leaves is taken to one quart of water and one quart of alcohol. This solution is allowed to stand on the leaves from twenty-four to forty-eight hours, after which it is boiled with three ounces of glycerin added, until a little more than three ounces of thick solution is left, and it is then added to six ounces of vaseline and one ounce of white beeswax.

Having thus described my invention what I claim as new, and desire to secure by Letters Patent of the United States, is as follows:

1. A composition of matter comprising essence of caraway leaves, water, glycerin, and vaseline, as set forth.

2. A composition of matter comprising essence of caraway leaves, water, glycerin, vaseline and beeswax intimately mixed, as set forth.

In testimony whereof I have hereunto set my hand this 1st day of April A. D. 1910, in the presence of the two subscribed witnesses.

MICHAEL STRAUB.

Witnesses:
CARLOS P. GRIFFIN,
CHARLES R. HOLTON.